(12) United States Patent
LeBlond et al.

(10) Patent No.: US 10,829,403 B2
(45) Date of Patent: Nov. 10, 2020

(54) TREATMENT OF SILICA BASED SOOT OR AN ARTICLE MADE OF SILICA BASED SOOT

(75) Inventors: Nicolas LeBlond, Painted Post, NY (US); Pushkar Tandon, Painted Post, NY (US); Srinivas Vemury, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 333 days.

(21) Appl. No.: 13/206,004

(22) Filed: Aug. 9, 2011

(65) Prior Publication Data

US 2012/0202674 A1 Aug. 9, 2012

Related U.S. Application Data

(60) Provisional application No. 61/373,005, filed on Aug. 12, 2010.

(51) Int. Cl.
| C03B 37/01 | (2006.01) |
| C03B 19/14 | (2006.01) |
| C03B 37/012 | (2006.01) |
| C03B 37/014 | (2006.01) |

(52) U.S. Cl.
CPC .... *C03B 19/1453* (2013.01); *C03B 37/01282* (2013.01); *C03B 37/01446* (2013.01)

(58) Field of Classification Search
CPC ................................................ C03B 37/01446
USPC ................................................... 65/424, 426
See application file for complete search history.

(56) References Cited

U.S. PATENT DOCUMENTS

| | | | | |
|---|---|---|---|---|
| 4,263,031 A | * | 4/1981 | Schultz | 65/422 |
| 4,775,401 A | * | 10/1988 | Fleming et al. | 65/395 |
| 4,854,956 A | * | 8/1989 | Pluijms | C03B 29/02 |
| | | | | 65/120 |
| 4,969,941 A | * | 11/1990 | Kyoto et al. | 65/391 |
| 5,157,747 A | * | 10/1992 | Aktins et al. | 385/37 |
| 5,320,659 A | * | 6/1994 | Ishiguro et al. | 65/423 |
| 5,356,447 A | | 10/1994 | Bhandarkar | |
| 6,799,442 B1 | | 10/2004 | Costa et al. | |
| 6,813,908 B2 | * | 11/2004 | Early et al. | 65/399 |
| 2002/0023466 A1 | | 2/2002 | Mandich et al. | |
| 2002/0108404 A1 | | 8/2002 | Burke et al. | |
| 2004/0107735 A1 | * | 6/2004 | Fletcher et al. | 65/412 |
| 2004/0139765 A1 | * | 7/2004 | Hirano et al. | 65/412 |
| 2005/0044886 A1 | * | 3/2005 | Okasinski et al. | 62/617 |
| 2006/0183623 A1 | * | 8/2006 | Ikuta et al. | 501/54 |
| 2009/0272716 A1 | | 11/2009 | Bookbinder et al. | |
| 2010/0071421 A1 | | 3/2010 | Dawes et al. | |

FOREIGN PATENT DOCUMENTS

| CN | 1042322 | 5/1990 |
| JP | 63190734 | 8/1988 |
| JP | 63215526 | 9/1988 |
| JP | 1145346 | 6/1989 |
| JP | 1164740 | 6/1989 |
| JP | 5-32429 | 2/1993 |
| JP | 1993032429 | 2/1993 |
| JP | 7157326 | 6/1995 |

OTHER PUBLICATIONS

Reinecke et al. "Knudsen diffusion, gas permeability, and water content in an unconsolidated porous medium", Water Resources Research, vol. 38, No. 12, 1280. pp. 16-1 through 16-15. (Dec. 2002).*
Tandon, P., "Doping of Silica During Sintering", J. Non-Crystalline Solids, 351 (16-17), 1466-1472 (2005).
Jena, P.K., "Studies on kinetics of low-temperature chlorination of ZrO2 by gaseous carbon tetrachloride", Metallurgical and materials transactions B, 1995 26(2): 235-240.
McDaniel, M.P. "Surface Halides of Silica: 1. Chloride" J. Phys. Chem. 1981, 85, 532-537.
Oct. 11, 2011 International Search Report issued in counterpart application No. PCT/US2011/046101.
Tandon, Pushkar, Doping of silica during sintering, Journal of Non-Crystalline Solids 351 (2005) pp. 1466-1472.
Tandon, Pushkar; Murtagh, Michael, Particle-vapor interaction in deposition systems: influence on deposit morphology chemical Engineering Science 60 (2005) pp. 1685-1699.
Rosner, Daniel E.; Tandon, Pushkar, Prediction and Correlation of Accessible Area of Large Multiparticle Aggregates, AIChE Journal, Jul. 1994, vol. 40, No. 7.
R. Byron Bird et al., Transport Phenomena 571 (1960).
CN201180038877.4 First Office Action dated Nov. 15, 2014, Chinese Patent Office.
JP2013524100 Office Action dated May 7, 2015; Japanese Patent Office.

* cited by examiner

*Primary Examiner* — John M Hoffmann
(74) *Attorney, Agent, or Firm* — Smit Kapadia

(57) ABSTRACT

One embodiment of the disclosure relates to a method of cleaning silica-based soot or an article made of silica-based soot, the method comprising the step of treating silica-based soot or the article made of silica-based soot with at least one of the following compounds: (i) a mixture of CO and $Cl_2$ in a carrier gas such that the total concentration of CO and $Cl_2$ in the mixture is greater than 10% (by volume, in carrier gas) and the ratio of $CO:Cl_2$ is between 0.25 and 5; (ii) $CCl_4$ in a carrier gas, such that concentration $CCl_4$ is greater than 1% (by volume, in carrier gas). Preferably, the treatment by $CCl_4$ is performed at temperatures between 600° C., and 850° C. Preferably, the treatment with the CO and Cl mixture is performed at temperatures between 900° C. and 1200° C. The carrier gas may be, for example, He, Ar, $N_2$, or the combination thereof.

6 Claims, 6 Drawing Sheets

TREATMENT OF SILICA BASED SOOT OR AN ARTICLE MADE OF SILICA BASED SOOT

CROSS-REFERENCE

This application claims the benefit of priority under 35 U.S.C. § 119 of U.S. Provisional Application Ser. No. 61/373,005 filed on Aug. 12, 2010 the content of which is relied upon and incorporated herein by reference in its entirety.

BACKGROUND

The disclosure relates generally to a method of decreasing the concentration of impurities in silica soot, and more particularly to a method of decreasing the concentration of $ZrO_2$ and $Cr_2O_3$ particles that are present (i) in soot which may be used in manufacturing processes that utilize compressed soot or fumed silica in optical preform manufacturing, or in manufacturing of other articles, (ii) in glass or silica soot articles such as optical preforms.

Optical soot preforms are used in making optical fibers. These soot preforms are sintered into glass and then drawn into optical fibers. One method of making soot preforms includes pressing of the fumed silica or reclaimed soot around a core cane or around an OVD soot covered core cane. The pressed soot preform is further heat-treated, dehydrated and cleaned of some impurities by treatment with chlorine ($Cl_2$, typically for about 4 hrs) at about 3% concentration by volume. The "cleaned" preform is sintered into a glass blank, and then drawn into optical fiber.

During the making of the optical preforms, $ZrO_2$ and $Cr_2O_3$ particles are often present in the soot and thus are incorporated into the preform. These refractory particles have melting temperatures that are much higher than the draw temperatures and can be the sources for fiber breaks if left incorporated in the fiber. The sizes of these refractory particles have to be below a certain size (e.g., below 0.2 or 0.1 µm) for them to not cause fiber breaks under tensile loading. If the initial size of the $Cr_2O_3$ particles is relatively small (less than 0.25 µm), this can be done by treating preforms with dehydration agents such as chlorine. However, $Cl_2$ cleaning is ineffective at removing $ZrO_2$ particles, or for larger sized $Cr_2O_3$ particles. That is, $ZrO_2$ and larger $Cr_2O_3$ particles (i.e., 0.5 µm or larger in cross-section) that are present in the soot or in optical soot preforms cannot be eliminated or sufficiently decreased in size by using standard $Cl_2$ treatment.

However, particle impurities for certain processes (soot pressing, for example) can be larger in size and can be present in significant concentrations, making them difficult to remove using a standard treatment with $Cl_2$.

No admission is made that any reference cited herein constitutes prior art. Applicant expressly reserves the right to challenge the accuracy and pertinence of any cited documents.

SUMMARY

One embodiment of the disclosure relates to a method of cleaning silica-based soot or an article made of silica-based soot, the method comprising the step of:

treating silica-based soot or the article made of silica-based soot with at least one of the following compounds:

(i) a mixture of CO and $Cl_2$ in a carrier gas such that the total concentration of CO and $Cl_2$ in the mixture is greater than 10%, by volume and the ratio of CO:$Cl_2$ is between 0.25 and 5;

(ii) $CCl_4$ in a carrier gas, such that concentration $CCl_4$ is greater than 1% by volume.

Preferably, the treatment by $CCl_4$ is performed at temperatures between 600° C., and 850° C. Preferably, the treatment with the CO and Cl mixture is performed at temperatures between 900° C. and 1200° C. Preferably, the treatment by $CCl_4$ is performed for at least 20 min, more preferably for at least 50 min Preferably, the treatment with the CO and $Cl_2$ mixture is performed for at least 30 min, more preferably for at least 100 min.

An additional embodiment of the disclosure relates to a method of cleaning silica-based soot or an article made of silica-based soot, the method comprising the following steps:

treating said silica-based soot or said article made of silica-based soot with (i) $CCl_4$ in a carrier gas, such that concentration $CCl_4$ is greater than 1%, by volume; and (ii) a mixture of CO and $Cl_2$ in a carrier gas such that the total concentration of CO and $Cl_2$ in said mixture is greater than 10%, by volume and the ratio of CO:$Cl_2$ is between 0.25 and 5;

wherein said treatment with $CCl_4$ is performed either before, or after the treatment with the mixture of CO and $Cl_2$.

Preferably, the treatment with $CCl_4$ is performed at temperatures between 600° C., and 850° C., and the treatment with the mixture of CO and Cl is performed at temperatures between 900° C. and 1200° C.

The method(s) disclosed herein can advantageously remove refractory particles from silica-based soot and silica-based soot articles (e.g., optical soot preforms). Another advantage of the method(s) disclosed herein is that treatment of silica-based soot preforms lowers the concentration and/or or eliminates the presence of undesirable refractory particles, which that can result in elimination of these particles as sources of fiber breaks. Another advantage of the method(s) disclosed herein is that after the treatment of silica-based soot preforms, the larger particles are decreased in size such that they are no longer sources of fiber breaks. For example 1 µm, 2 µm, 5 µm, or even 10 µm $Cr_2O_3$ and/or $ZrO_2$ particles can be decreased in size to 0.2 µm, or 0.1 µm, or smaller.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments will be further clarified by the following examples.

One embodiment of the disclosure relates to a method of cleaning of silica-based soot or an article made of silica-based soot. According to this embodiment the method comprises the step of:

treating silica-based soot or the article made of silica-based soot with at least one of the following compounds:
(i) a mixture of CO and Cl in a carrier gas such that the total concentration of CO and $Cl_2$ in said mixture is greater than 10%, by volume and the ratio of CO:$Cl_2$ is between 0.25 and 5;
(ii) $CCl_4$ in a carrier gas, such that concentration $CCl_4$ is greater than 1% by volume, in carrier gas. For example, $CCl_4$ concentration in carrier gas may be 1.5%, 2 vol %, 3 vol %, 5 vol %, 10 vol %, 15 vol %, 20 vol %, 25 vol %, 30 vol %, 35 vol %, or 40 vol %.) Preferably, the treatment by $CCl_4$ is performed at temperatures between 600° C., and 850° C. Preferably, the treatment with the CO and Cl mixture is performed at temperatures between 900° C. and 1200° C., more preferably, between 1000° C. and 1200° C., and even more preferably between 1100° C. and 1200° C. (e.g., 1050° C., 1075° C., 1100° C., 1125° C., 1150° C., 1175° C., or 1190° C.). The carrier gas may be, for example, He, Ar, $N_2$, or the combination thereof.

Preferably, the treatment by $CCl_4$ is performed for at least 2 min, more preferably for at lest 5 min, more preferably at lest 10 or 20 min, for example for at least 50 min. Preferably, the treatment with the CO and $Cl_2$ mixture is performed for at least 5 min, preferably at least 20 min or 30 min, more preferably for at least 100 min. Preferably, the ratio of CO to $Cl_2$ is between 0.5 and 2, more preferably between 0.75 and 1.5.

According to one embodiment the method of cleaning silica-based soot or an article made of silica-based soot comprises the following steps:
treating said silica-based soot or said article made of silica-based soot with
(i) $CCl_4$ in a carrier gas, such that concentration $CCl_4$ is greater than 1%, by volume; and
(ii) a mixture of CO and $Cl_2$ in a carrier gas such that the total concentration of CO and $Cl_2$ in said mixture is greater than 10%, by volume and the ratio of CO:$Cl_2$ is between 0.25 and 5;
wherein the treatment with $CCl_4$ is performed either before, or after the treatment with the mixture of CO and $Cl_2$. Preferably, the treatment by $CCl_4$ is performed at temperatures between 600° C., and 850° C., and the treatment with the mixture of CO and $Cl_2$ is performed at temperatures between 900° C. and 1200° C. (e.g., 950° C., 975° C., 1000° C., 1025° C., 1050° C., 1075° C., 1100° C., 1125° C., 1150° C., 1175° C., 1190° C.). Preferably the treatment with $CCl_4$ is performed for at least 2 min, and the treatment with a mixture of CO and $Cl_2$ is performed for at least 5 min.

Figure 1:
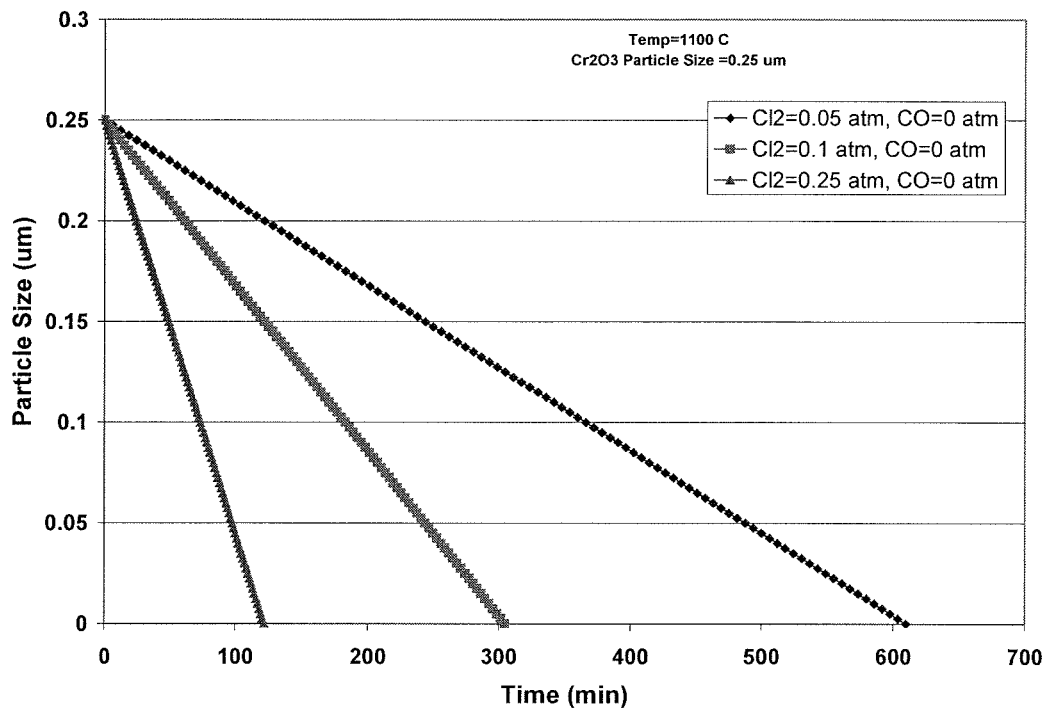
FIG. 1 illustrates the decrease in $Cr_2O_3$ particle size (initial size=0.25 µm) at 1100° C. at different concentrations of $Cl_2$.

FIG. 1 illustrates the decrease in $Cr_2O_3$ particle size at three different concentrations of chlorine ($Cl_2$ was utilized alone, without CO), at the treatment temperature of 1100° C. The initial size of the $Cr_2O_3$ particles was 0.25 µm. In these three examples the $Cl_2$ concentration in the carrier gas was 5%, 10%, and 25% by volume respectively, which is higher than the typically used concentrations of $Cl_2$ when treating optical preforms.

FIG. 1 illustrates that even when the initial $Cr_2O_3$ particle sizes are relatively small (about 0.25 µm) the amount of time needed to eliminate the $Cr_2O_3$ particles is relatively long even when high concentration of chlorine (about 10%) is used at high temperatures (about 1100° C.). For example, FIG. 1 shows that at a $Cl_2$ concentration of 10%, the required treatment time to eliminate 0.25 µm $Cr_2O_3$ particles is approximately 5 hrs (300 min). Even when the $Cl_2$ concentration is 25%, the required treatment time to eliminate 0.25 µm $Cr_2O_3$ particles is approximately 2 hrs.

Figure 2:
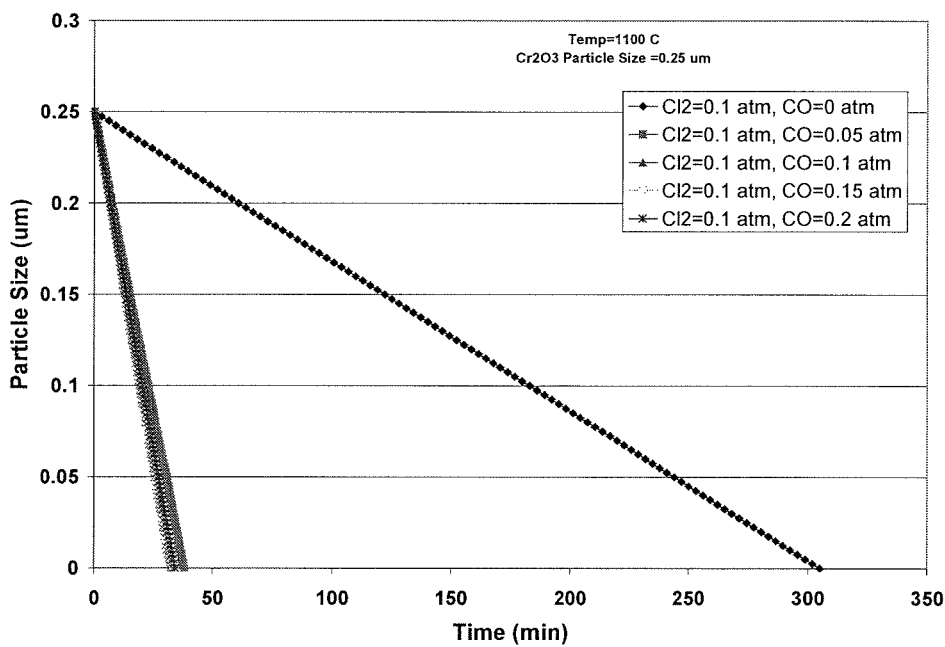
FIG. 2 illustrates the decrease in $Cr_2O_3$ particle size (initial size=0.25 µm) at 1100° C., at different concentrations of $Cl_2$ and CO, according to one embodiment.

As shown in FIG. 2, the soot treatment time is dramatically decreased when a mixture of carbon monoxide and chlorine is utilized. For example, FIG. 2 illustrates that the addition of 10% CO to 10% of $Cl_2$ in a carrier gas results in a ten-fold decrease in treatment time (from about 300 min, as shown in FIG. 1, to about 30 min). The initial particle sizes of $Cr_2O_3$ particles of FIG. 2 is identical to those of FIG. 1 (about 0.25 µm), and the treatment temperature is also the same (about 1100° C.). FIG. 2 illustrates that the shortest treatment time is achieved when the ratio of chlorine to carbon monoxide is 1:1. It is noted that when the concentration of $Cl_2$ is increased (e.g., to about 15% (0.15 atm), 20% (0.2 atm), 25% (0.25 atm)), with the corresponding increase n CO concentration, the treatment time for soot containing $Cr_2O_3$ particles may be decreased even further.

Figure 3:
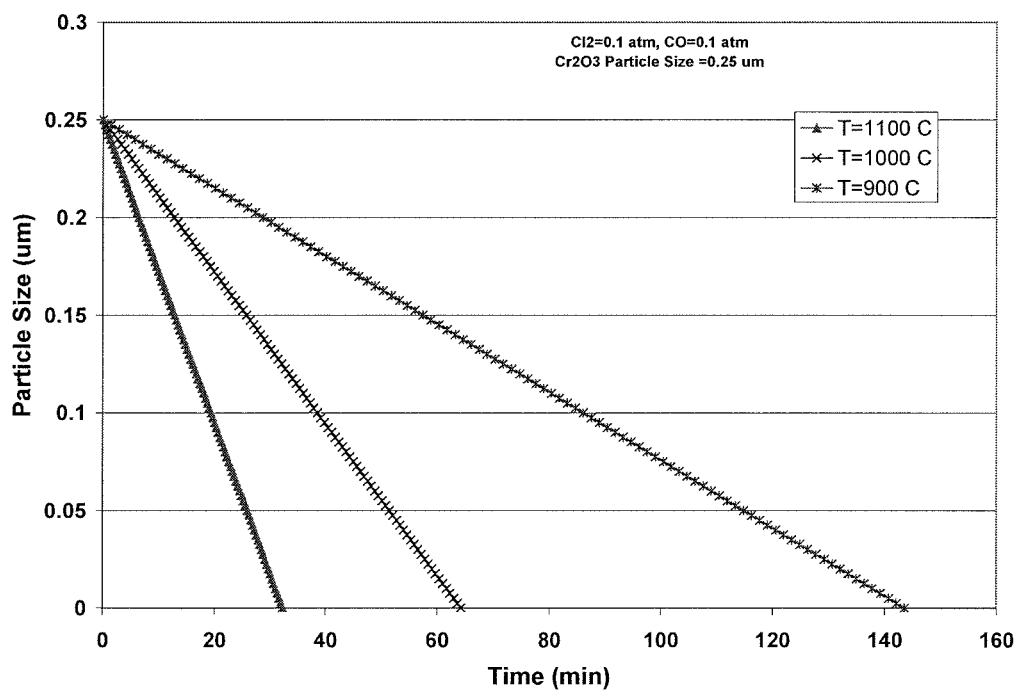
FIG. 3 illustrates the decrease in $Cr_2O_3$ particle size (initial size=0.25 µm) with time, when soot is treated, according to at least one embodiment, at three different temperatures with a mixture of CO and $Cl_2$.

The particle size decrease rates at different temperatures, when silica soot is treated with a CO and $Cl_2$ mixture at 10% concentrations of each CO and $Cl_2$ is shown in FIG. 3. For example, when the treatment (particle processing) temperatures is 900° C., the treatment time for the elimination of metal oxide particles such as $Cr_2O_3$, when the initial particle sizes are about 0.25 µm, is about 140 min-150 min. When the treatment temperature is 1100° C., the treatment time for elimination of metal oxide particles, such as $Cr_2O_3$, is about 30-35 min (when the initial particle sizes are 0.25 µm). Thus, in order to decrease the silica soot process treatment time when using the $CO/Cl_2$ mixture, it is advantageous to have the reaction(s) at temperatures greater than 900° C., more preferably greater than 1000° C. and even more preferably greater than 1100° C. (e.g., 1125° C., 1150° C., 1175° C., 1190° C.). However, at temperatures above 1200° C., there can be significant etching of the silica soot by the $CO/Cl_2$ mixture and some sintering of the soot preform. Consequently, the maximum temperature is preferably not higher than 1200° C.

Figure 4A:
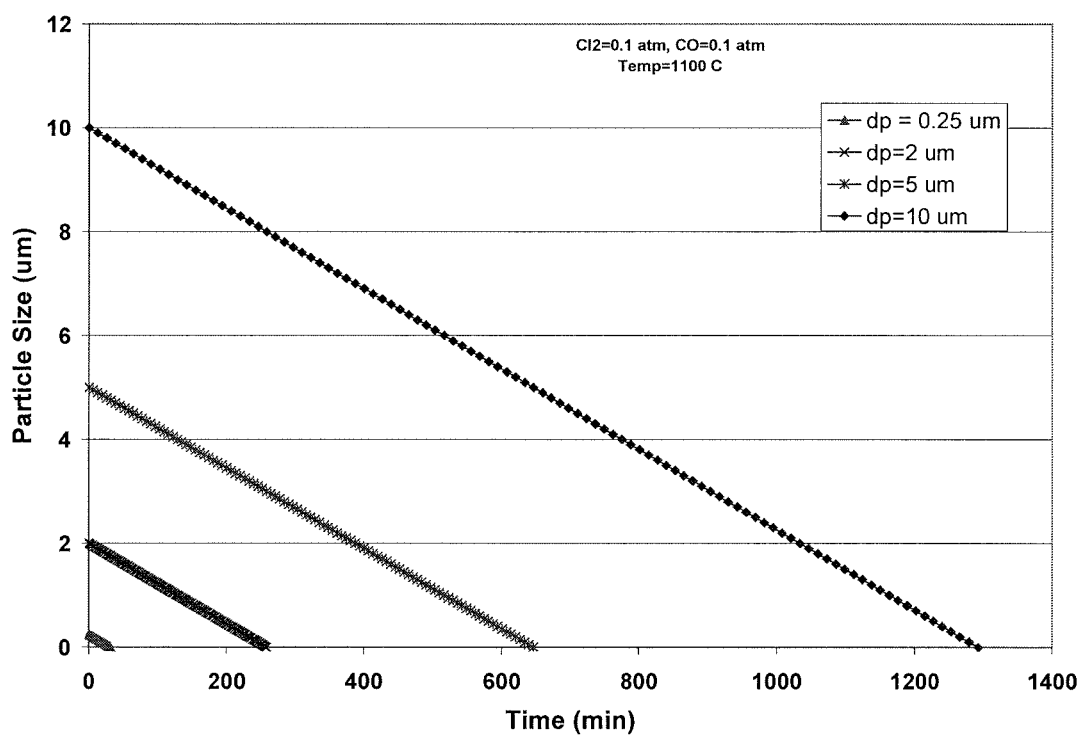
FIG. 4A illustrates the decrease in $Cr_2O_3$ particle size versus time, for different initial particle sizes when soot is treated, according to one embodiment, at 1100° C. with a mixture of CO and $Cl_2$.
Figure 4B:
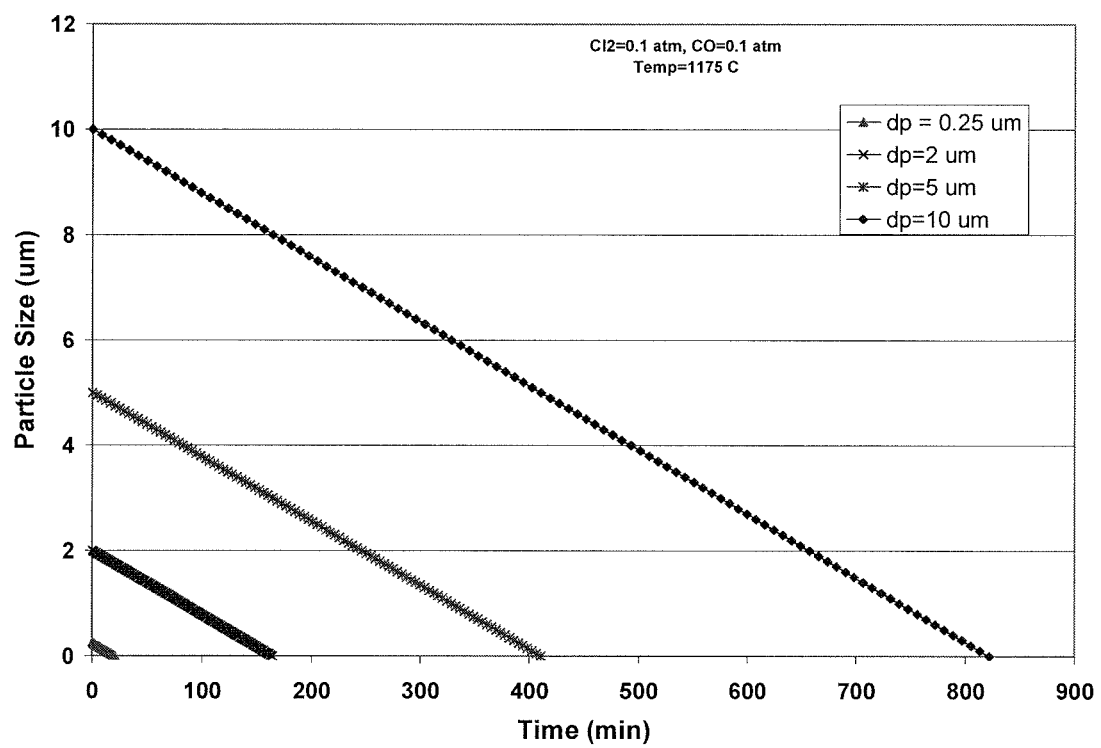
FIG. 4B illustrates the decrease in $Cr_2O_3$ particle size versus time, for different initial particle sizes when soot is treated, according to one embodiment, at 1175° C. with a mixture of CO and $Cl_2$.
Figure 4C:
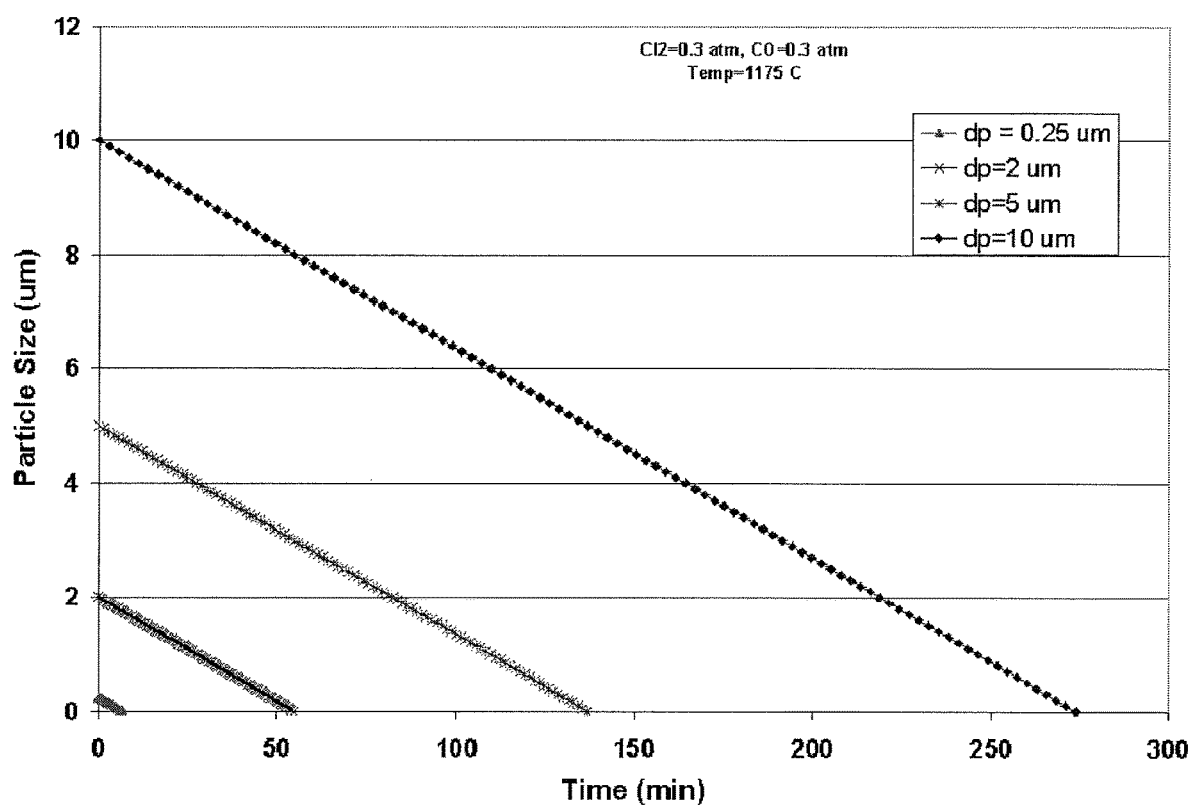
FIG. 4C illustrates the decrease in $Cr_2O_3$ particle size versus time, for different initial particle sizes when soot is treated according to one embodiment, at 1175° C. with a mixture of CO and $Cl_2$, but at higher concentrations compared to FIG. 4B.

The rate of particle size decrease for different initial particle size is illustrated in FIG. 4A. We discovered that when $Cr_2O_3$ particles are large enough such that their presence in the soot preform can later result in fiber breaks, the treatment time needs to be chosen appropriately, based on the maximum particle size. For example, if one knows that silica soot contains $Cr_2O_3$ particles that are up to 2 µm in diameter, (if the treatment temperature is 1100° C.) the processing time with the $CO/Cl_2$ mixture (10%/10% vol % in carrier gas) should be about 4 to 4.5 hrs. If the $Cr_2O_3$ particles have a maximum diameter of 5 µm, the processing time with the $CO/Cl_2$ mixture (same concentration) should be about 10-12 hrs (if the treatment temperature is 1100° C.). However, these processing times can be decreased if the temperature during $CO/Cl_2$ is increased to 1150° C.-1175° C. It is noted for that when the concentration of $Cl_2$ is increased (e.g., to about 15%, 20%, or 25%) with the corresponding increase in CO concentration, such that the ratio of CO:$Cl_2$ is between 0.5 and 2 (preferably, between 0.75, and more preferably 1) the treatment time for soot containing larger $Cr_2O_3$ particles (e.g., 1-10 µm diameter, or larger) may be decreased even further. FIG. 4B illustrates the rate of particle size decrease for different initial particle size when the treatment temperature is 1175° C. (same concentrations (10 vol % of $Cl_2$ and 10 vol % of CO, in carrier gas). FIG. 4C illustrates the rate of particle size decrease for different initial particle size when the treatment temperature is 1175° C., but the concentrations $Cl_2$ and CO (in carrier gas) were each increased to 30 vol % (0.3 atm).

It is noted that the four plots in FIGS. 4A-4C are parallel to one another. Thus, to determine the appropriate treatment time for the soot containing maximum particle sizes other than those depicted in FIGS. 4A-4C, one needs to simply draw line parallel to those shown in FIG. 4A-4C, but starting at the appropriate particle size level. Similarly, if other metal oxides are present in the soot, or if using uses different concentrations of $Cl_2$ and CO, one can create a graph similar to that of FIG. 4A-4C, to determine the appropriate treatment time for the metal oxide particles of the specific compositions that are present in the soot and that are present in sizes that are large enough that requires either their elimination, or the decrease in size of these particles below a certain level.

We discovered that for $Cr_2O_3$ particles of size $d_p$ (cross sectional length, or diameter, in µm) treated at temperature T (in ° K) with mixture of chlorine and carbon monoxide gases having chlorine and carbon monoxide concentrations of $y_{Cl2}$ and $y_{CO}$ (in atm), the treatment time should be greater than the diffusion time and reaction time, as shown below, i.e.:

$$t_{treatment,Cr2O3}(\text{in min}) > t_{diffusion} + t_{reaction,Cr2O3}$$

where the diffusion reaction time is a function of soot layer thickness L (in cm) and diffusion rate of the $CO/Cl_2$ mixture $D_{eff}$ (in cm²/sec) through the porous soot preform, or loose silica soot and is given as:

$$t_{diffusion}(\text{in min}) = \frac{L^2}{60 D_{eff}} \quad [2]$$

and the reaction time is given as:

$$t_{reaction,Cr2O3}(\text{in min}) = \frac{4.3 \times 10^{-4} (d_p(\text{in } \mu m)) \text{Exp}[12000/T(\text{in K})]}{y_{Cl2} x_{Cl2} (1 - 1.35 x_{Cl2} + 0.372 x_{Cl2}^2)} \quad [3]$$

Methods to find the diffusion rate ($D_{eff}$) of a gas in porous soot preform are known in the art. In Eq. [3], parameter $x_{Cl2}$ is given as $x_{Cl2}$: $(y_{Cl2})/(y_{Cl2}+y_{CO})$, where $y_{Cl2}$ and $y_{CO}$ are the partial pressure of chlorine and carbon monoxide respectively. According to some embodiments the treatment time with the $CO/Cl_2$ mixture is greater than 5 min, for example 10 min to 100 hrs. Preferably the treatment time with the $CO/Cl_2$ mixture is 10 min to 15 or 20 hrs, for example 20 min, 30 min, 50 min, 1 hr, 1.5 hrs, 2 hrs, 3 hrs, 4 hrs, 6 hrs, 8 hrs, 10 hrs, 12 hrs., or some period of time there between.

If $ZrO_2$ particles are present in the soot, chemical treatment of soot with chlorine and CO mixture is not very effective. That is, although some $ZrO_2$ particles will be eliminated or minimized in size to the appropriate level during the treatment with the $CO/Cl_2$ mixture as described above, not all of the $ZrO_2$ particles will be decreased in size to the appropriate levels (0.1 µm, or smaller). However we discovered that the treatment of $ZrO_2$ particles with $CCl_4$ is very effective. We have found that $CCl_4$ treatment of silica soot, for example of optical preforms containing porous silica soot is most effective in temperature range between 600° C.-850° C. Below 600° C., the reaction of $CCl_4$ is slow and above 850° C., $CCl_4$ can decompose and react with silica muffle and silica soot particles, as well as form elemental carbon.

Figure 5:
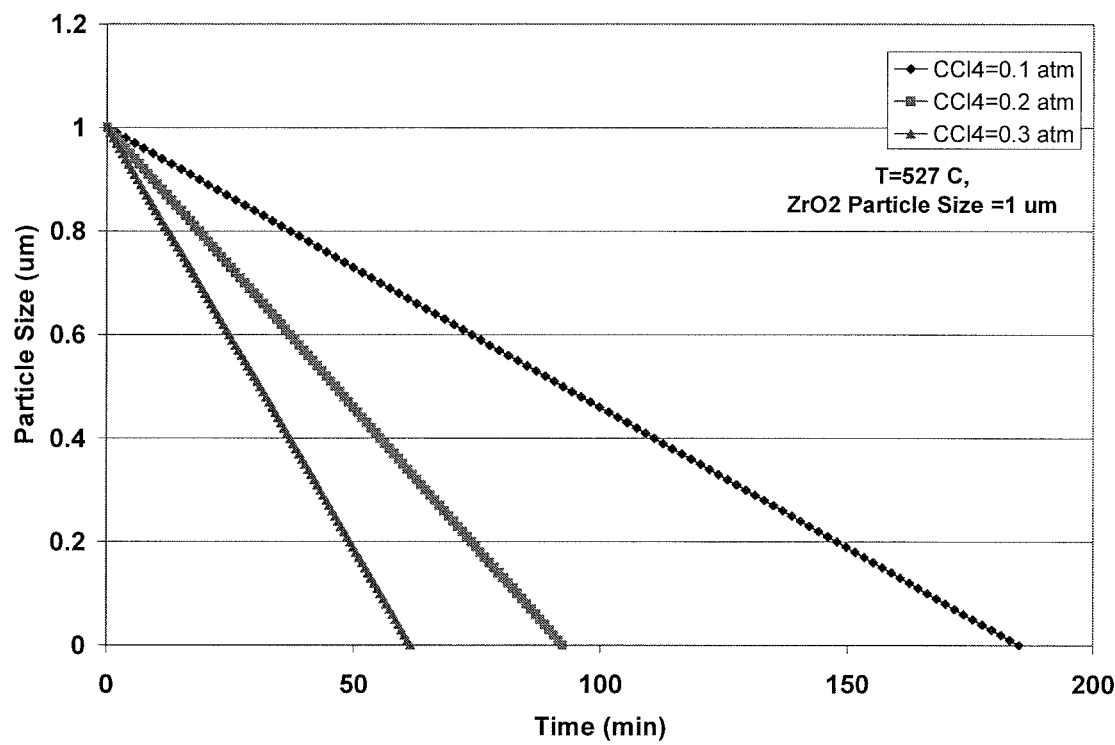
FIG. 5 illustrates the decrease in $ZrO_2$ particle size (initial size=1 µm) after treatment according to at least one embodiment, with different concentrations of $CCl_4$, at 527° C.
Figure 6:
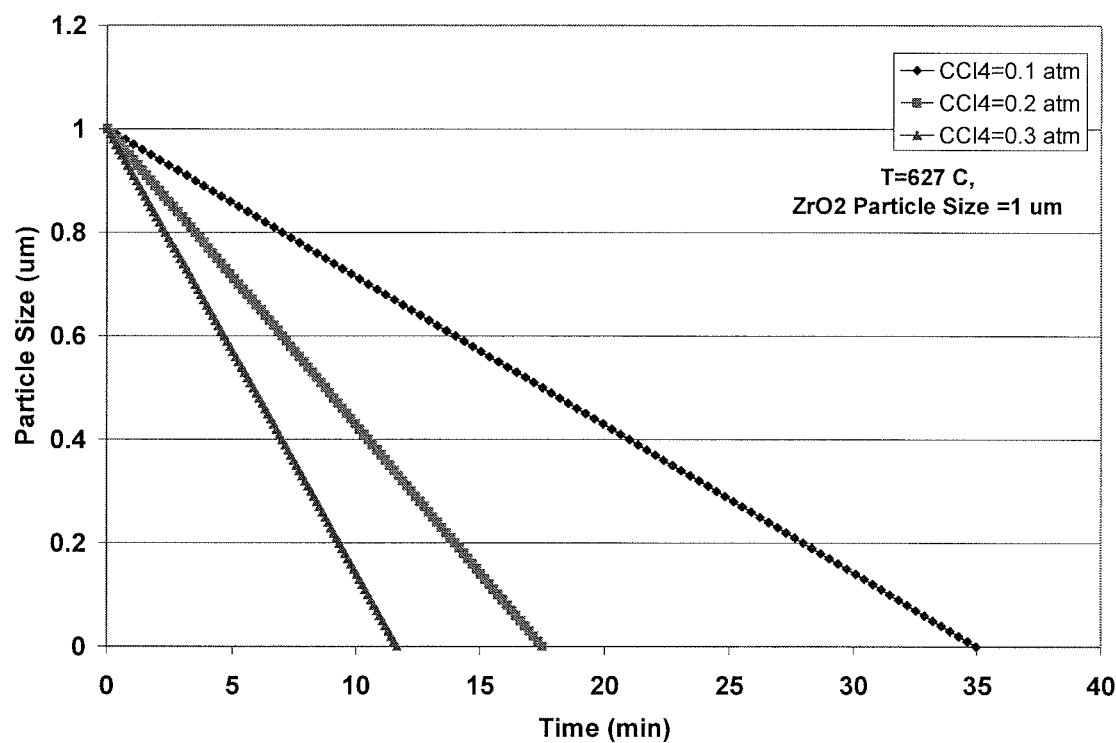
FIG. 6 illustrates the decrease in $ZrO_2$ particle size (initial size=1 µm) after treatment according to at least one embodiment, with different concentrations of $CCl_4$, at 627° C.
Figure 7:
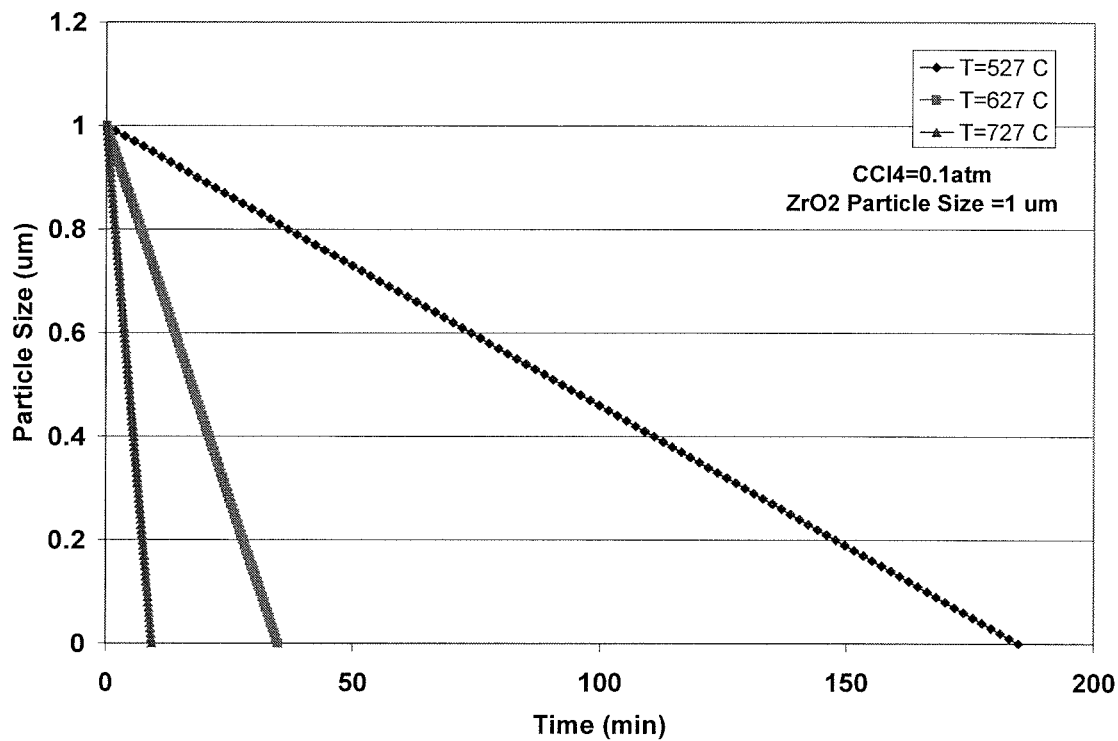
FIG. 7 illustrates the decrease in $ZrO_2$ particle size (initial size=1 µm) after treatment according to at least one embodiment, with $CCl_4$ at three different temperatures.
Figure 8:
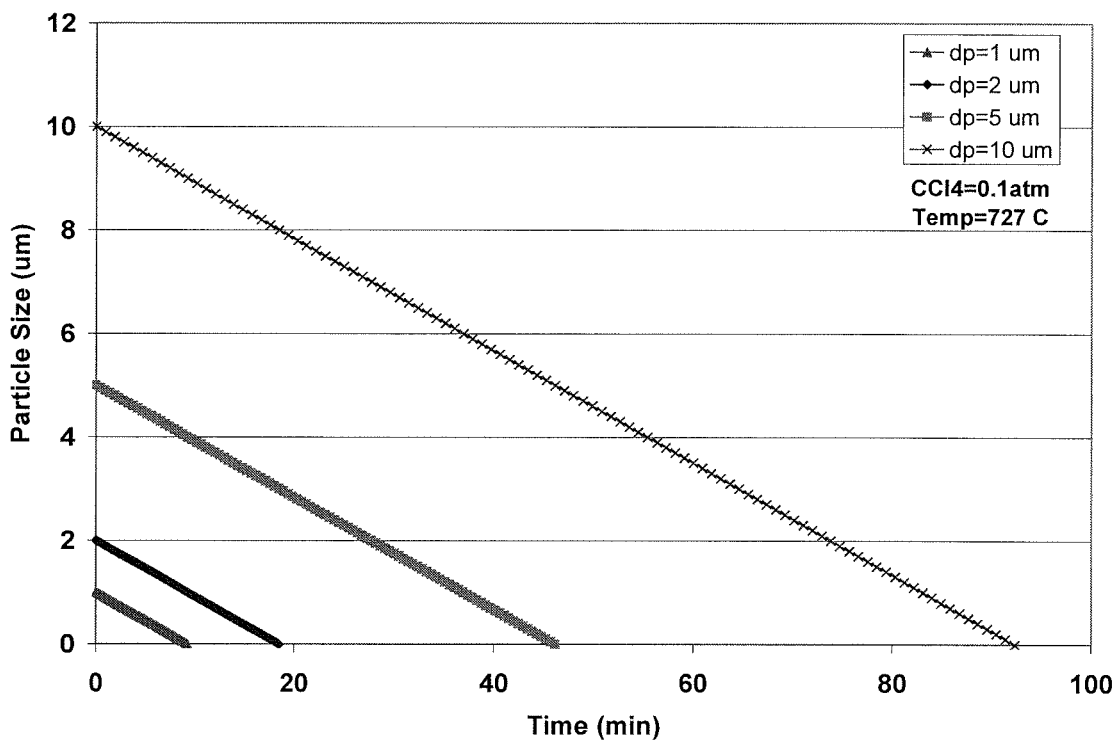
FIG. 8 illustrates the decrease in $ZrO_2$ particle size versus time, for different initial particle sizes, when soot is treated according to one embodiment at 727° C. with $CCl_4$.

The rate of $ZrO_2$ particle size decrease at different $CCl_4$ concentrations, temperatures and for the specified initial $ZrO_2$ particle sizes is shown in FIGS. 5-8. More specifically, FIGS. 5 and 6 illustrate that the decrease in $ZrO_2$ particle size occurs faster with higher concentrations of $CCl_4$ and at higher temperatures. For example, as shown in FIG. 5, at a treatment temperature of 527° C., when the concentration $CCl_4$ was increased from 10% to 30% (0.1 atm to 0.3 atm) the complete elimination of $ZrO_2$ particles up to 1 µm in cross-section occurred in 62 min instead of 185 min. As shown in FIG. 6, at a treatment temperature of 627° C., the treatment proceeded much faster than at 527° C., and when the concentration of $CCl_4$ was increased from 10% to 30% (0.1 atm to 0.3 atm) the complete elimination of $ZrO_2$ particles up to 1 µm in cross-section occurs in less than 15 min, instead of 35 min. FIG. 7 illustrates the decrease in $ZrO_2$ particle size (initial size=1 µm) at different temperatures, for $CCl_4$ concentrations of 10 vol %, in carrier gas (0.1 atm). As shown in FIG. 7, when the temperature was changed from 527° C. to 727° C., the treatment time was decreased from about 185 min to about 10 min. FIG. 8 illustrates the decrease in $ZrO_2$ particle size (initial size=1 µm) for different initial particle sizes at 727° C. for $CCl_4$ concentrations of 0.1 atm (i.e., 10%, per volume, in carrier gas). This figure indicates that the treatment time needs to be chosen appropriately, given the particle sizes present in the soot. For example, if one knows that silica soot contains $ZrO_2$ particles that are up to 2 μm in diameter if the treatment temperature is 727° C., the processing time with the $CCl_4$ (assuming a concentration of 10% (or 0.1 atm)) is less than 20 min. If the $ZrO_2$ particles have a maximum diameter of 5μm, the processing time with the $CCl_4$ (assuming concentration of 0.1 atm) is about 45-50 min. If the $ZrO_2$ particles have a maximum diameter of 10 μm, the processing time with $CCl_4$ (assuming a concentration of 10%) is about 90-95 min. However, these processing times can be decreased if the concentration of $CCl_4$ is increased.

Experimental Data:

Two grams of silica soot was placed inside a tube furnace equipped with a fused silica muffle. A flow of 2.36% $CCl_4$ in He was established and the furnace was ramped 10° C./min to 950° C. An infrared spectrum of the gas products downstream of the silica soot sample was acquired every 60 seconds. The results show that:

Below 400° C.: no reaction, only desorption of water from soot.

400° C.-600° C.: drying/doping of soot:

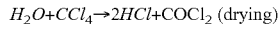
$H_2O + CCl_4 \rightarrow 2HCl + COCl_2$ (drying)

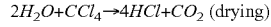
$2H_2O + CCl_4 \rightarrow 4HCl + CO_2$ (drying)

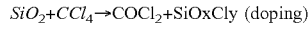
$SiO_2 + CCl_4 \rightarrow COCl_2 + SiOxCly$ (doping)

600° C.-850° C.: radical decomposition of $CCl_4$:

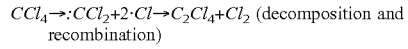
$CCl_4 \rightarrow :CCl_2 + 2 \cdot Cl \rightarrow C_2Cl_4 + Cl_2$ (decomposition and recombination)

Above 850° C.: etching of $SiO_2$, carbonization:

$SiO_2 + CCl_4 \rightarrow SiCl_4 + CO_2$ (etching)

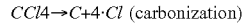
$CCl4 \rightarrow C + 4 \cdot Cl$ (carbonization)

This data indicates that in order to (i) maximize etching and volatilization of $Cr_2O_3$ and $ZrO_2$ and (ii) minimize etching of silica (muffle and preform) and carbonization, it is preferable to carry out the $CCl_4$ treatment of soot at about 800° C. Carbonization would not be a serious issue if the carbon stayed within the muffle, but the experimental data indicate that the carbon particles formed are small enough to be entrained outside of the muffle and deposit inside the piping downstream of the furnace, which could cause maintenance issues later on.

In one experiment, 8.7 g of silica soot doped with 1 wt % $Cr_2O_3$ (average particle size of 2 μm), 1 wt % of $Fe_2O_3$ (average particle size of 3 μm), and 1 wt % of $ZrO_2$ (average particle size of 5 μm) was pressed into a silica soot pellet with a density of 0.90 g/cm³ and treated with a mixture of 5% $CCl_4$ in He (this embodiment utilized He as carrier gas) at 800° C. for 45 minutes. The chemical analysis of the resulting pellet showed 0.53 wt % of $Cr_2O_3$, 0.13 wt % of $Fe_2O_3$, and 0.062 wt % or $ZrO_2$. This experimental data further demonstrates the effectiveness of $CCl_4$ at removing $ZrO_2$, and in reducing the amount and size of $Fe_2O_3$ and $Cr_2O_3$ particles in silica soot.

We discovered that for $ZrO_2$ particles of size $d_p$ (cross sectional length, or diameter, in μm) treated at temperature T (in °K) with mixture of carbon tetrachloride gas having concentration of $y_{CCl4}$ (in atm), the treatment time should be greater than the diffusion time and reaction time, as shown below, i.e.:

$$t_{treatment,ZrO2}(\text{in min}) > t_{diffusion} + t_{reaction,ZrO2} \quad [4]$$

where the diffusion reaction time is a function of soot layer thickness L (in cm) and diffusion rate of the $CCl_4$ $D_{eff,CCl4}$ (in cm²/sec) through the porous soot preform and is given as:

$$t_{diffusion}(\text{in min}) = \frac{L^2}{60 D_{eff,CCl4}} \quad [5]$$

and the reaction time is given as:

$$t_{reaction,ZrO2}(\text{in min}) = \frac{5.75 \times 10^{-6} d_p(\text{in } \mu m) \text{Exp}[12000/T]}{y_{CCl4}(\text{in atm})} \quad [6]$$

According to some embodiments the treatment time with the $CCl_4$ is greater than 2 min, for example 5 minutes to 100 hours. Preferably the treatment time with the $CO/Cl_2$ mixture is 10 min to 15, for example 20 min, 30 min, 50 min, 1 hr, 1.5 hrs, 2 hrs, 3 hrs, 4 hrs, 6 hrs, 8 hrs, 10 hrs, 12 hrs, or some period of time there between.

The invention is further illustrated by the following examples depicted in Tables 1 and 2. Examples 1-54 of Table 1 show the total treatment times for the 6 cm thick silica based soot layers with maximum initial $Cr_2O_3$ particles of different sizes, when treated with different combinations of chlorine and carbon monoxide mixtures at various treatment temperatures, such that the size of the $Cr_2O_3$ particles was reduced to zero (i.e., no $Cr_2O_3$). As illustrated in these examples, the diffusion times are much smaller than the reaction times, and the total treatment time is almost equal to the reaction time. Examples 55-90 of Table 2 show the total treatment times (resulted in reduction of $ZrO_2$ particles sizes to zero) for the 6 cm thick soot layers with initial $ZrO_2$ particles of different sizes, when treated with different concentrations of carbon tetrachloride at various treatment temperatures. Many soot bodies articles include both of these impurities and therefore would need treatment with $CCl_4$ (between 600° C. and 850° C.) and $CO+Cl_2$ mixture (between 900° C. and 1200° C.). It is also noted that the in some applications total elimination of $Cr_2O_3$ and $ZrO_2$ particles may not be necessary, as long as their diameter is decreased below a critical size. For example, in fiber preforms, one may decide to simply decrease the particle sizes to a maximum size of about 0.2 μm or less, or to 0.1 μm or less, so that they are unlikely to become a cause of fiber breaks.

TABLE 1

Treatment of $Cr_2O_3$ containing soot with $CO/Cl_2$ mixture

| Example # | Treatment Temperature [C.] | Soot Layer Thickness (cm) | Soot Layer Density (g/cm³) | Diffusivity, cm²/sec | Initial $Cr_2O_3$ Particle Size (μm) | Chlorine concent. (atm) | Carbon monoxide (atm) | $xCl_2$ | Diffusion Time (min) | Reaction Time (min) | Total Treatment Time (min) |
|---|---|---|---|---|---|---|---|---|---|---|---|
| 1 | 900 | 6.00 | 0.60 | 1.01 | 0.25 | 0.1 | 0 | 1.00 | 0.59 | 1354.87 | 1355 |
| 2 | 900 | 6.00 | 0.60 | 1.01 | 0.25 | 0.1 | 0.05 | 0.67 | 0.59 | 168.51 | 169 |

TABLE 1-continued

Treatment of $Cr_2O_3$ containing soot with $CO/Cl_2$ mixture

| Example # | Treatment Temperature [C.] | Soot Layer Thickness (cm) | Soot Layer Density (g/cm$^3$) | Diffusivity, cm$^2$/sec | Initial $Cr_2O_3$ Particle Size (μm) | Chlorine concent. (atm) | Carbon monoxide (atm) | $xCl_2$ | Diffusion Time (min) | Reaction Time (min) | Total Treatment Time (min) |
|---|---|---|---|---|---|---|---|---|---|---|---|
| 3 | 900 | 6.00 | 0.60 | 1.01 | 0.25 | 0.1 | 0.1 | 0.50 | 0.59 | 142.62 | 143 |
| 4 | 900 | 6.00 | 0.60 | 1.01 | 0.25 | 0.1 | 0.2 | 0.33 | 0.59 | 151.22 | 152 |
| 5 | 900 | 6.00 | 0.80 | 0.64 | 0.25 | 0.1 | 0 | 1 | 0.94 | 1354.87 | 1356 |
| 6 | 900 | 6.00 | 0.60 | 1.01 | 0.25 | 0.2 | 0 | 1 | 0.59 | 677.43 | 678 |
| 7 | 900 | 6.00 | 0.60 | 1.01 | 0.25 | 0.2 | 0.1 | 0.67 | 0.59 | 84.25 | 85 |
| 8 | 900 | 6.00 | 0.60 | 1.01 | 0.25 | 0.2 | 0.2 | 0.5 | 0.59 | 71.31 | 72 |
| 9 | 900 | 6.00 | 0.60 | 1.01 | 0.25 | 0.2 | 0.4 | 0.33 | 0.59 | 75.61 | 76 |
| 10 | 900 | 6.00 | 0.60 | 1.01 | 1 | 0.1 | 0.1 | 0.50 | 0.59 | 570.47 | 571 |
| 11 | 900 | 6.00 | 0.60 | 1.01 | 1 | 0.2 | 0.2 | 0.5 | 0.59 | 285.23 | 286 |
| 12 | 900 | 6.00 | 0.60 | 1.01 | 1 | 0.4 | 0.4 | 0.5 | 0.59 | 142.62 | 143 |
| 13 | 900 | 6.00 | 0.60 | 1.01 | 5 | 0.1 | 0.1 | 0.5 | 0.59 | 2852.35 | 2853 |
| 14 | 900 | 6.00 | 0.60 | 1.01 | 5 | 0.2 | 0.2 | 0.5 | 0.59 | 1426.17 | 1427 |
| 15 | 900 | 6.00 | 0.60 | 1.01 | 5 | 0.4 | 0.4 | 0.5 | 0.59 | 713.09 | 714 |
| 16 | 900 | 6.00 | 0.60 | 1.01 | 10 | 0.1 | 0.1 | 0.5 | 0.59 | 5704.70 | 5705 |
| 17 | 900 | 6.00 | 0.60 | 1.01 | 10 | 0.2 | 0.2 | 0.5 | 0.59 | 2852.35 | 2853 |
| 18 | 900 | 6.00 | 0.60 | 1.01 | 10 | 0.4 | 0.4 | 0.5 | 0.59 | 1426.17 | 1427 |
| 19 | 1000 | 6.00 | 0.60 | 1.09 | 0.25 | 0.1 | 0 | 1.00 | 0.55 | 606.58 | 607 |
| 20 | 1000 | 6.00 | 0.60 | 1.09 | 0.25 | 0.1 | 0.05 | 0.67 | 0.55 | 75.44 | 76 |
| 21 | 1000 | 6.00 | 0.60 | 1.09 | 0.25 | 0.1 | 0.1 | 0.50 | 0.55 | 63.85 | 64 |
| 22 | 1000 | 6.00 | 0.60 | 1.09 | 0.25 | 0.1 | 0.2 | 0.33 | 0.55 | 67.70 | 68 |
| 23 | 1000 | 6.00 | 0.80 | 0.68 | 0.25 | 0.1 | 0 | 1 | 0.88 | 606.58 | 607 |
| 24 | 1000 | 6.00 | 0.60 | 1.09 | 0.25 | 0.2 | 0 | 1 | 0.55 | 303.29 | 304 |
| 25 | 1000 | 6.00 | 0.60 | 1.09 | 0.25 | 0.2 | 0.1 | 0.67 | 0.55 | 37.72 | 38 |
| 26 | 1000 | 6.00 | 0.60 | 1.09 | 0.25 | 0.2 | 0.2 | 0.5 | 0.55 | 31.93 | 32 |
| 27 | 1000 | 6.00 | 0.60 | 1.09 | 0.25 | 0.2 | 0.4 | 0.33 | 0.55 | 33.85 | 34 |
| 28 | 1000 | 6.00 | 0.60 | 1.09 | 1 | 0.1 | 0.1 | 0.50 | 0.55 | 255.40 | 256 |
| 29 | 1000 | 6.00 | 0.60 | 1.09 | 1 | 0.2 | 0.2 | 0.5 | 0.55 | 127.70 | 128 |
| 30 | 1000 | 6.00 | 0.60 | 1.09 | 1 | 0.4 | 0.4 | 0.5 | 0.55 | 63.85 | 64 |
| 31 | 1000 | 6.00 | 0.60 | 1.09 | 5 | 0.1 | 0.1 | 0.5 | 0.55 | 1277.00 | 1278 |
| 32 | 1000 | 6.00 | 0.60 | 1.09 | 5 | 0.2 | 0.2 | 0.5 | 0.55 | 638.50 | 639 |
| 33 | 1000 | 6.00 | 0.60 | 1.09 | 5 | 0.4 | 0.4 | 0.5 | 0.55 | 319.25 | 320 |
| 34 | 1000 | 6.00 | 0.60 | 1.09 | 10 | 0.1 | 0.1 | 0.5 | 0.55 | 2554.00 | 2555 |
| 35 | 1000 | 6.00 | 0.60 | 1.09 | 10 | 0.2 | 0.2 | 0.5 | 0.55 | 1277.00 | 1278 |
| 36 | 1000 | 6.00 | 0.60 | 1.09 | 10 | 0.4 | 0.4 | 0.5 | 0.55 | 638.50 | 639 |
| 37 | 1150 | 6.00 | 0.60 | 1.19 | 0.25 | 0.1 | 0 | 1.00 | 0.50 | 224.57 | 225 |
| 38 | 1150 | 6.00 | 0.60 | 1.19 | 0.25 | 0.1 | 0.05 | 0.67 | 0.50 | 27.93 | 28 |
| 39 | 1150 | 6.00 | 0.60 | 1.19 | 0.25 | 0.1 | 0.1 | 0.50 | 0.50 | 23.64 | 24 |
| 40 | 1150 | 6.00 | 0.60 | 1.19 | 0.25 | 0.1 | 0.2 | 0.33 | 0.50 | 25.06 | 26 |
| 41 | 1150 | 6.00 | 0.80 | 0.75 | 0.25 | 0.1 | 0 | 1 | 0.80 | 224.57 | 225 |
| 42 | 1150 | 6.00 | 0.60 | 1.19 | 0.25 | 0.2 | 0 | 1 | 0.50 | 112.28 | 113 |
| 43 | 1150 | 6.00 | 0.60 | 1.19 | 0.25 | 0.2 | 0.1 | 0.67 | 0.50 | 13.96 | 14 |
| 44 | 1150 | 6.00 | 0.60 | 1.19 | 0.25 | 0.2 | 0.2 | 0.5 | 0.50 | 11.82 | 12 |
| 45 | 1150 | 6.00 | 0.60 | 1.19 | 0.25 | 0.2 | 0.4 | 0.33 | 0.50 | 12.53 | 13 |
| 46 | 1150 | 6.00 | 0.60 | 1.19 | 1 | 0.1 | 0.1 | 0.50 | 0.50 | 94.55 | 95 |
| 47 | 1150 | 6.00 | 0.60 | 1.19 | 1 | 0.2 | 0.2 | 0.5 | 0.50 | 47.28 | 48 |
| 48 | 1150 | 6.00 | 0.60 | 1.19 | 1 | 0.4 | 0.4 | 0.5 | 0.50 | 23.64 | 24 |
| 49 | 1150 | 6.00 | 0.60 | 1.19 | 5 | 0.1 | 0.1 | 0.5 | 0.50 | 472.77 | 473 |
| 50 | 1150 | 6.00 | 0.60 | 1.19 | 5 | 0.2 | 0.2 | 0.5 | 0.50 | 236.38 | 237 |
| 51 | 1150 | 6.00 | 0.60 | 1.19 | 5 | 0.4 | 0.4 | 0.5 | 0.50 | 118.19 | 119 |
| 52 | 1150 | 6.00 | 0.60 | 1.19 | 10 | 0.1 | 0.1 | 0.5 | 0.50 | 945.54 | 946 |
| 53 | 1150 | 6.00 | 0.60 | 1.19 | 10 | 0.2 | 0.2 | 0.5 | 0.50 | 472.77 | 473 |
| 54 | 1150 | 6.00 | 0.60 | 1.19 | 10 | 0.4 | 0.4 | 0.5 | 0.50 | 236.38 | 237 |

TABLE 2

Treatment of $ZrO_2$ containing soot with $CCl_4$/Reaction of $CCl_4$ with $ZrO_2$

| Example # | Treatment Temperature [C.] | Soot Layer Thickness (cm) | Soot Layer Density (g/cm$^3$) | Diffusivity, cm$^2$/sec | Initial $ZrO_2$ Particle Size (um) | $CCl_4$ conc. (atm) | Diffusion Time (min) | Reaction Time (min) | Total Treatment Time (min) |
|---|---|---|---|---|---|---|---|---|---|
| 55 | 600 | 6.00 | 0.60 | 0.61 | 1 | 0.1 | 0.98 | 53.72 | 54.70 |
| 56 | 600 | 6.00 | 0.80 | 0.42 | 1 | 0.1 | 1.43 | 53.72 | 55.14 |
| 57 | 600 | 6.00 | 0.60 | 0.61 | 1 | 0.2 | 0.98 | 26.86 | 27.84 |
| 58 | 600 | 6.00 | 0.60 | 0.61 | 2 | 0.1 | 0.98 | 107.43 | 108.42 |
| 59 | 600 | 6.00 | 0.60 | 0.61 | 2 | 0.2 | 0.98 | 53.72 | 54.70 |
| 60 | 600 | 6.00 | 0.60 | 0.61 | 2 | 0.4 | 0.98 | 26.86 | 27.84 |
| 61 | 600 | 6.00 | 0.60 | 0.61 | 5 | 0.1 | 0.98 | 268.58 | 269.57 |
| 62 | 600 | 6.00 | 0.60 | 0.61 | 5 | 0.2 | 0.98 | 134.29 | 135.27 |

TABLE 2-continued

Treatment of ZrO₂ containing soot with CCl₄/Reaction of CCl₄ with ZrO₂

| Example # | Treatment Temperature [C.] | Soot Layer Thickness (cm) | Soot Layer Density (g/cm³) | Diffusivity, cm²/sec | Initial ZrO₂ Particle Size (um) | CCl₄ conc. (atm) | Diffusion Time (min) | Reaction Time (min) | Total Treatment Time (min) |
|---|---|---|---|---|---|---|---|---|---|
| 63 | 600 | 6.00 | 0.60 | 0.61 | 5 | 0.4 | 0.98 | 67.15 | 68.13 |
| 64 | 600 | 6.00 | 0.60 | 0.61 | 10 | 0.1 | 0.98 | 537.16 | 538.15 |
| 65 | 600 | 6.00 | 0.60 | 0.61 | 10 | 0.2 | 0.98 | 268.58 | 269.57 |
| 66 | 600 | 6.00 | 0.60 | 0.61 | 10 | 0.4 | 0.98 | 134.29 | 135.27 |
| 67 | 700 | 6.00 | 0.60 | 0.69 | 1 | 0.1 | 0.87 | 13.08 | 13.95 |
| 68 | 700 | 6.00 | 0.80 | 0.469 | 1 | 0.1 | 1.28 | 13.08 | 14.36 |
| 69 | 700 | 6.00 | 0.60 | 0.69 | 1 | 0.2 | 0.87 | 6.54 | 7.41 |
| 70 | 700 | 6.00 | 0.60 | 0.69 | 2 | 0.1 | 0.87 | 26.16 | 27.03 |
| 71 | 700 | 6.00 | 0.60 | 0.69 | 2 | 0.2 | 0.87 | 13.08 | 13.95 |
| 72 | 700 | 6.00 | 0.60 | 0.69 | 2 | 0.4 | 0.87 | 6.54 | 7.41 |
| 73 | 700 | 6.00 | 0.60 | 0.69 | 5 | 0.1 | 0.87 | 65.39 | 66.26 |
| 74 | 700 | 6.00 | 0.60 | 0.69 | 5 | 0.2 | 0.87 | 32.70 | 33.57 |
| 75 | 700 | 6.00 | 0.60 | 0.69 | 5 | 0.4 | 0.87 | 16.35 | 17.22 |
| 76 | 700 | 6.00 | 0.60 | 0.69 | 10 | 0.1 | 0.87 | 130.79 | 131.66 |
| 77 | 700 | 6.00 | 0.60 | 0.69 | 10 | 0.2 | 0.87 | 65.39 | 66.26 |
| 78 | 700 | 6.00 | 0.60 | 0.69 | 10 | 0.4 | 0.87 | 32.70 | 33.57 |
| 79 | 850 | 6.00 | 0.60 | 0.805 | 1 | 0.1 | 0.75 | 2.52 | 3.26 |
| 80 | 850 | 6.00 | 0.80 | 0.53 | 1 | 0.1 | 1.13 | 2.52 | 3.65 |
| 81 | 850 | 6.00 | 0.60 | 0.805 | 1 | 0.2 | 0.75 | 1.26 | 2.00 |
| 82 | 850 | 6.00 | 0.60 | 0.805 | 2 | 0.1 | 0.75 | 5.04 | 5.78 |
| 83 | 850 | 6.00 | 0.60 | 0.805 | 2 | 0.2 | 0.75 | 2.52 | 3.26 |
| 84 | 850 | 6.00 | 0.60 | 0.805 | 2 | 0.4 | 0.75 | 1.26 | 2.00 |
| 85 | 850 | 6.00 | 0.60 | 0.805 | 5 | 0.1 | 0.75 | 12.59 | 13.34 |
| 86 | 850 | 6.00 | 0.60 | 0.805 | 5 | 0.2 | 0.75 | 6.30 | 7.04 |
| 87 | 850 | 6.00 | 0.60 | 0.805 | 5 | 0.4 | 0.75 | 3.15 | 3.89 |
| 88 | 850 | 6.00 | 0.60 | 0.805 | 10 | 0.1 | 0.75 | 25.19 | 25.93 |
| 89 | 850 | 6.00 | 0.60 | 0.805 | 10 | 0.2 | 0.75 | 12.59 | 13.34 |
| 90 | 850 | 6.00 | 0.60 | 0.805 | 10 | 0.4 | 0.75 | 6.30 | 7.04 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of treating silica-based soot or an article comprising a silica-based soot layer, said method comprising;

treating said silica-based soot or said article comprising a silica-based soot layer, said silica-based soot or said silica-based soot layer comprising $ZrO_2$, with $CCl_4$ in a carrier gas at a treatment temperature between 600° C. and 850° C. such that a concentration of $CCl_4$ is greater than 1%, by volume, and a treatment time, $t_{treatment,\ ZrO2}$, is:

$$t_{treatment,ZrO2}(\text{in min}) > t_{diffusion,ZrO2} + t_{reaction,ZrO2},$$

a diffusion time, $t_{diffusion,\ ZrO2}$, and a reaction time, $t_{reaction,\ ZrO2}$, have the following values:

$$t_{diffusion,ZrO2}(\text{in min}) = \frac{L^2}{60\ D_{eff,CCl_4}};$$

and $$t_{reaction,ZrO2}(\text{in min}) = \frac{5.75 \times 10^{-6} d_p(\text{in }\mu m)\text{Exp}[12000/T]}{y_{CCl4}(\text{in atm})}.$$

and

L>0 and is a thickness of said silica-based soot or said silica-based soot layer, $D_{eff,\ CCl4}$ (in cm²/sec) is a diffusion rate of $CCl_4$ through said silica-based soot or said article comprising a silica-based soot layer, T is the treatment temperature, $y_{CCl4}$ is a partial pressure of $CCl_4$, and $d_p$>0 and is an initial particle size of said $ZrO_2$.

2. The method of treating silica-based soot or an article comprising a silica-based soot layer according to claim 1, wherein the treatment temperature T is between 750° C. and 850° C.

3. The method of treating silica-based soot or an article comprising a silica-based soot layer according to claim 1, wherein said treatment time, $t_{treatment,ZrO2}$, is at least 20 min.

4. The method of treating silica-based soot or an article comprising a silica-based soot layer according to claim 3, wherein said treatment time, $t_{treatment,\ ZrO2}$, is at least 50 min.

5. The method of treating silica-based soot or an article comprising a silica-based soot layer according to claim 3, wherein said treatment time, $t_{treatment,\ ZrO2}$, is at least 90 min.

6. A method of treating a porous silica-based soot preform with a soot layer having a thickness L, said method comprising:

treating said silica-based soot preform, said silica-based soot preform comprising $ZrO_2$, with $CCl_4$ in a carrier gas, such that a concentration of $CCl_4$ is greater than 1%, by volume, and a treatment time, $t_{treatment,\ ZrO2}$, with $CCl_4$ is:

$$t_{treatment, ZrO2} (\text{in min}) > t_{diffusion, ZrO2} + t_{reaction, ZrO2},$$

a diffusion time, $t_{diffusion,\ ZrO2}$, and a reaction time, $t_{reaction,\ ZrO2}$, have the following values:

$$t_{diffusion, ZrO2} (\text{in min}) = \frac{L^2}{60\ D_{eff, CCl_4}},$$

$$t_{reaction, ZrO2} (\text{in min}) = \frac{5.75 \times 10^{-6} d_p (\text{in}\ \mu m) \text{Exp}[12000/T]}{y_{CCl_4} (\text{in atm})},$$

and $L>0$ and is said soot layer thickness, $D_{eff,\ CCl4}$ (in $cm^2/sec$) is a diffusion rate of the $CCl_4$ through said porous silica-based soot preform, T is a treatment temperature for treating said porous soot preform in said $CCl_4$ in a carrier gas, $y_{CCl4}$ is a partial pressure of $CCl_4$, and $d_p>0$ and is an initial particle size of said $ZrO_2$.

* * * * *